United States Patent [19]
Fiedler et al.

[11] 4,441,868
[45] Apr. 10, 1984

[54] FUEL INJECTION PUMP FOR INTERNAL COMBUSTION ENGINES

[75] Inventors: Helmut Fiedler, Glen-Ellyn, Ill.; Ernst Ritter, Stuttgart, Fed. Rep. of Germany

[73] Assignee: Robert Bosch GmbH, Stuttgart, Fed. Rep. of Germany

[21] Appl. No.: 398,731

[22] Filed: Jul. 15, 1982

[30] Foreign Application Priority Data

Sep. 16, 1981 [DE] Fed. Rep. of Germany ....... 3136749

[51] Int. Cl.³ ............................................ F02M 59/44
[52] U.S. Cl. .................................. 417/490; 417/499
[58] Field of Search ............... 417/490, 494, 499, 501, 417/570; 123/495, 500, 501, 503

[56] References Cited

U.S. PATENT DOCUMENTS

| 3,885,895 | 5/1975 | Staudt et al. | 417/499 |
| 3,945,773 | 3/1976 | Vuaille | 417/501 X |
| 3,985,474 | 10/1976 | Vuaille | 417/490 |

FOREIGN PATENT DOCUMENTS

| 1172897 | 1/1965 | Fed. Rep. of Germany. | |
| 1318296 | 1/1963 | France | 417/501 |
| 1365247 | 5/1964 | France | 417/494 |

*Primary Examiner*—Leonard E. Smith
*Attorney, Agent, or Firm*—Edwin E. Greigg

[57] ABSTRACT

There is proposed an improved fuel injection pump which will prevent erosion at the pump housing caused by the fuel stream leaving the return flow openings at the end of injection, by providing an impact protection ring on the cylinder bushing. Guide faces on the ring inclined toward the center (M) thereof are molded into the impact protection ring in the vicinity of a cylindrical wall portion. The impact protection ring rests on an abutment shoulder disposed above the return flow openings, in the vicinity of the return flow openings encloses an annular chamber, and is pressed by a snap ring without play and with a defined prestressing force against the abutment shoulder. As a result of the guiding action of the guide faces on the impact protection ring, a rotational movement of the impact protection ring triggered by the obliquely exiting fuel stream is assured, in order to attain a long service life for the pump.

8 Claims, 6 Drawing Figures

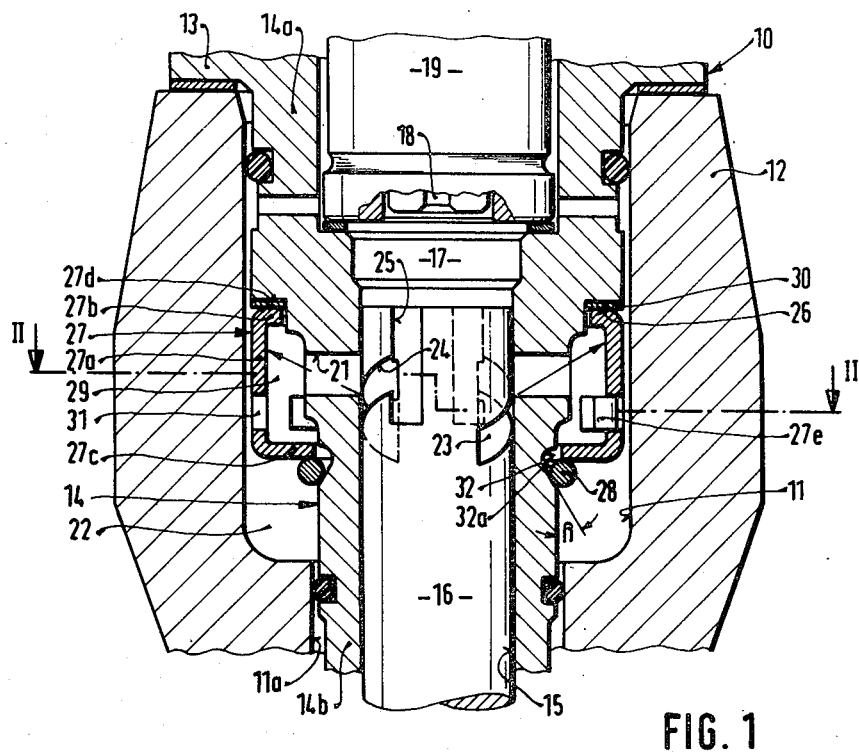
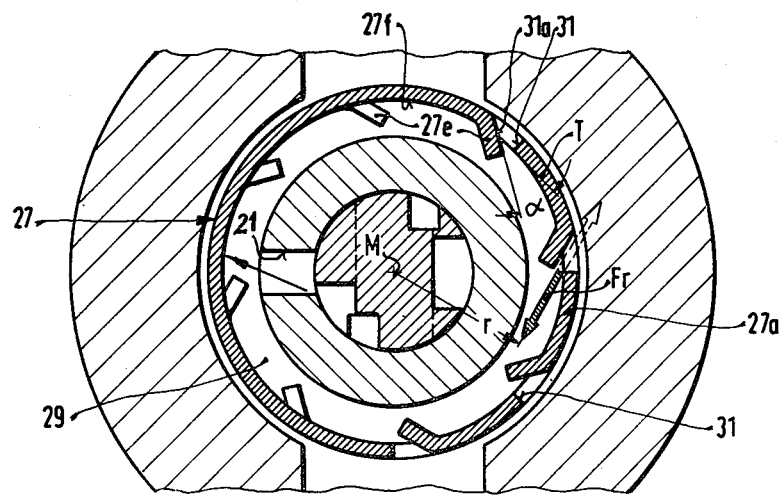
FIG. 1
FIG. 2

FUEL INJECTION PUMP FOR INTERNAL COMBUSTION ENGINES

BACKGROUND OF THE INVENTION

The invention is based on a fuel injection pump as generally described by the preamble to the main claim. A fuel injection pump of this type is already known from German patent 11 72 897, the impact protection ring of which is drawn from sheet steel and is pressed by a snap ring, acting as a holder means, against an end face of a holder bushing embodied as an abutment shoulder. Given the previously conventional injection pressures, such a protection ring was completely satisfactory, and the hardened surface of the ring resisted the impact energy of the fuel stream leaving the return flow opening at the end of injection. However, it has been found that with the increase in injection pressures required for modern direct-injection engines, the impact protection rings previously used are destroyed in the course of time; the fuel stream which exits with extremely high energy wears off the surface of the inner wall of the impact protection ring by erosion until the wall has been broken through. Subsequently, the pump housing, which is normally of aluminum, destroyed very rapidly by the fuel stream, which is no longer hindered by the protection ring.

Longer service life of the impact protection ring and thus a longer life of the injection pumps can be attained if the impact protection ring executes a rotary movement during operation, so that new wall locations are continually being presented to the fuel stream. Such a rotary movement was demonstrated in some cases, but in the known rings it took place only occasionally; a rotary movement which was made compulsory by appropriate means and which took place under all operating conditions was not previously attainable.

From German Offenlegungsschrift 24 42 010 and German Offenlegungsschrift 24 42 088, sheath-like impact protection rings have become known which were built in with play both in the axial and the radial directions in order to enable a rotary movement. In these fuel injection pumps, the danger exists that oscillations on the part of the impact protection rings caused by the existing play will destroy the adjacent abutment faces and also the end faces of the rings very rapidly; a reliable rotary movement occurring under all conditions could not be observed. In the slotted embodiment of the known ring according to German Offenlegungsschrift 24 42 010, the danger exists that the gap existing at the connecting point of the ring presents a face which the fuel stream can act upon, and the gap experiences the flow through it of fuel.

OBJECT AND SUMMARY OF THE INVENTION

It is the object of the invention to develop an impact protection ring in which by appropriate means it is possible to obtain rotation of the rings which can be observed in every operating state, which is controllable in accordance with operating principles and which is reliable.

In the fuel injection pump according to the invention revealed hereinafter, the energy of each fuel stream leaving the return flow opening upon the end of injection is converted into approximately tangential force components by means of the guide faces molded into the cylindrical wall portion, and as a result the impact protection ring is caused to rotate. Thus the impact face presented to the fuel stream is distributed over the entire circumference of the associated inner wall of the impact protection ring, so that the long-term stability of the ring is attained in the desired manner.

With the characteristics disclosed in the dependent claims, advantageous further embodiments and improvements to the impact protection ring, as well as alternative embodiments thereof, are attainable for the fuel injection pump defined in the main claim. The characteristics of claim 2 generate a sufficiently large force component acting in the circumferential direction of the impact protection ring. In a fuel injection pump embodied according to claim 1 or 2, having flow-through openings in the impact protection ring which are axially offset with respect to the return flow opening, the characteristics of claim 3 or of claims 4 and 5 provide for the formation of the guide faces, which cause the rotational movement of the impact protection ring, simultaneously with the flowthrough opening or directly adjacent thereto, and the characteristics of claim 4 make it possible to fabricate the flowthrough openings and the guide faces in a single procedure.

If the impact protection rings are embodied in accordance with the characteristics of claims 6 and 7, then the energy of the fuel stream leaving the return flow opening is converted by means of the guide faces formed in the inclined wall parts into a virtually tangential force component acting in the circumferential direction, thereby causing the impact protection ring to rotate.

In a fuel injection pump embodied in accordance with the expanded preamble of claim 8, in which the impact protection ring is guided at either end with a radially inwardly bent collar on the cylinder bushing and is subjected in the axial direction to a snap ring serving as a holder means, which is placed into an annular groove in the outer circumference of the cylinder bushing, the annular groove being provided with a conical abutment face (see German patent 11 72 897, already cited), then by means of the provisions claimed in claim 8 satisfactory function of the rotating impact protection ring is assured, without it being possible for fuel to exit at either end of the ring and destroy the bearing points.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1. is a longitudinal cross section taken along the line I—I of FIG. 2;

FIG. 2 is a cross section taken along the line II—II of FIG. 1 through the portion of the first exemplary embodiment which is essential to the invention;

DESCRIPTION OF THE PREFERRED EMBODIMENTS

Figure 3:
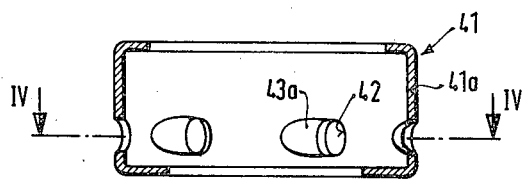
FIG. 3 is a longitudinal section taken through an impact protection cap of the second exemplary embodiment.

In the preferred, first exemplary embodiment, shown only in part in FIGS. 1 and 2, a pumping element 10 of a fuel injection pump for internal combustion engines is inserted into an offset reception bore 11 of the pump housing 12 cast of aluminum and is secured in a known manner by means of a flange 13. The flange 13 is molded onto a cylinder bushing 14, in the cylinder bore 15 of which a pump piston 16 is guided so as to be both axially and rotationally movable. The pump work chamber 17, defined on one end by the pump piston 16 as part of the cylinder bore 15, is closed off on the other end, toward the supply side, by a pressure valve housing 19 including a pressure valve 18; the latter two elements are both of known design and are shown only in part. The pump work chamber 17 communicates via two diametrically opposed control bores 21, serving as both intake and return flow openings, with a return flow chamber 22 also serving as a suction chamber, into which the fuel, set under inlet pressure by a pre-supply pump, flows by way of a fuel inlet line not shown in further detail.

Cut into the jacket face of the pump piston 16 are two recesses 23 embodied as oblique grooves, the limitation of these recesses oriented toward the pump work chamber 17 together with the jacket face of the pump piston 16 forms a control edge 24. Also, these recesses 23, one being in full lines and the other in dash lines, communicate continuously with the pump work chamber 17 via one stop groove 25, cut as a longitudinal groove into the pump piston 16.

Naturally, it is also possible, in place of the stop groove 25, for a longitudinal bore inside the pump piston 16 to connect the pump work chamber 17 with the recess 23, and in place of the recess 23 forming the control edge 24, the control edge can also be milled or ground into the jacket face in the form of screw threads.

The cylinder bushing 14 is fitted with a part 14a of larger diameter in the enlarged part of the reception bore 11, and with a part 14b of reduced diameter in the narrower part 11a of the reception bore 11, with little play.

At the transition between the two parts 14a and 14b of the cylinder bushing 14, there is an abutment shoulder 26 formed by a step, which is created on the cylinder bushing 14 by turning. An impact protection ring 27 is pushed onto the part 14b of the cylinder bushing 14 having a reduced diameter and is pressed by a snap ring 28, serving as a holder means, without play against the abutment shoulder 26, which is formed on the cylinder bushing 14 above the return flow openings 21 as seen in the pumping direction.

With a cylindrical wall portion 27a, the impact protection ring 27 encloses an annular chamber 29 in the vicinity of return flow openings 21. The annular chamber 29 connects the return flow openings 21 with the return flow chamber 22 via flowthrough openings 31 in the wall portion 27a which are axially offset with respect to the return flow openings 21. As an axial limitation of its cylindrical wall portion 27a, the impact protection ring 27 carries a radially inwardly bent, circular collar 27b and 27c on each of its ends, with which it is guided on the cylinder bushing 14.

As may be clearly seen in FIG. 2, the flowthrough openings 31 are each formed by a wall portion bent inward into the annular chamber 29 and sheared off on three sides, thus having a rectangular passageway cross section. The surfaces of the wall portions 27e oriented toward the flowthrough openings 31 are identified by reference numeral 31a and serve as guide faces causing a rotational movement of the ring 27. The guide faces 31a are inclined toward the center M of the ring and have an inclination angle $\alpha$, which is preferably between 5° and 35° and in the present case 30° with respect to a tangent T placed against a wall face 27f of the cylindrical wall portion 27a.

Between an end face 27d and the abutment shoulder 26, there is a stop disk 30 which serves to protect the abutment shoulder 26 and simultaneously represents an axial slide bearing for the impact protection ring 27 (see FIG. 1). In order that the impact protection ring 27 will not lift away from the abutment shoulder 26 in an uncontrolled manner, the snap ring 28 is set into an annular groove 32 in the outer circumference of the cylinder bushing 14, the annular groove 32 being provided with a conical abutment face 32a. The inclination angle $\beta$ of the conical abutment face 32a and the prestressing force of the snap ring 28 are adapted to one another such that they hold the impact protection ring 27 against the abutment shoulder 26 or the stop disk 30 without play, yet they do permit a rotary movement on the part of the impact protection ring 27 triggered by the recoil energy of the fuel leaving the return flow openings 21. Because of the fuel stream which at the end of injection leaves the return flow opening 21 with a great deal of energy, a pressure drop occurs between the annular chamber 29 inside the impact protection cap 27 and the return flow chamber 22 surrounding the cap 27; the potential difference of this pressure drop is converted into virtually tangential force components by means of the flowthrough openings provided with the guide faces 31a. In FIG. 2, a double arrow is included in one of the flowthrough openings 31, and the hollow portion of this arrow, directed outward, represents the energy of the fuel as it exits, and the shaded portion pointing inward, designated by the symbol $F_r$, represents the recoil force. This recoil force $F_r$ is a product of the cross sectional area of the flowthrough openings 31 and the pressure drop of the exiting fuel, and the torque generated by the exiting fuel in turn is a product of the recoil force $F_r$ and the lever arm r which is effective with respect to the center M of the impact cap, so that a drive torque of $M_d = F_r r$ can be calculated.

The abutment shoulder 26 does not have to be directly worked on the cylinder bushing 14 as in the illustrated example; instead, it may be embodied by the end face of a holder bushing or by an appropriate abutment shoulder in some other fastening element.

The compulsory rotational movement taking place with the described impact protection ring 27 and which can be calculated based on the recoil effect of the fuel is also promoted by various factors. As shown in FIGS. 1 and 2 by arrows inside the return flow openings 21, the fuel stream arising at the end of injection leaves the recess 23 in the pump pistons 16 obliquely and also has a component corresponding to the inclination of the oblique control edge 24 which acts in the circumferential direction of the impact protection ring 27, so that the fuel stream arriving at the inner wall face 27f of the impact protection ring 27 already imparts a rotational impulse to the impact protection ring. However, this is not sufficient in all cases to reliably cause the impact protection ring to rotate; instead, the already described embodiment of the guide faces 31a and the slide bearing between the stop disk 30 and the end face 27d as well as the defined pressure force exerted by the snap ring 28, all taken together, are required to provide absolutely reliable rotational movement of the ring 27.

The impact protection rings of the second and third exemplary embodiments are installed exactly like the impact protection ring 27 of the first exemplary embodiment shown in FIGS. 1 and 2, so that in order to illustrate these exemplary embodiments, only the appropriately modified impact protection rings are shown in FIGS. 3-6, with the aid of a longitudinal and cross sectional view, respectively.

Figure 4:
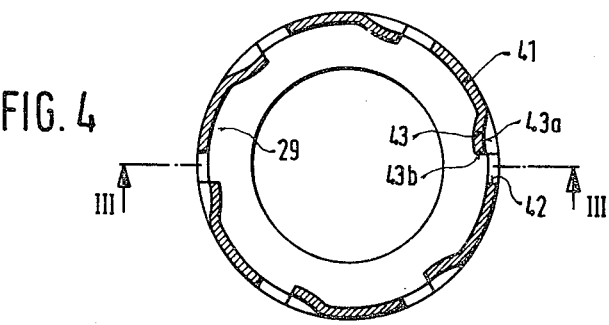
FIG. 4 is a cross section taken through an impact protection cap of the second exemplary embodiment on lines III—III.

FIG. 3 is a longitudinal section taken along the line III—III in FIG. 4 through an impact protection ring 41 of the second exemplary embodiment. FIG. 4 is a cross section taken along the line IV-IV of FIG. 3. The flow-through openings 42, cut into a cylindrical wall portion 41a in the form of radial bores, are axially offset, as in the first exemplary embodiment, to the return flow openings 21 shown in FIG. 1. Instead of the wall portions 27e of the first exemplary embodiment provided with the guide faces 31a, the impact protection ring 41 has six oblique perforations 43, adjoining the flowthrough openings 42 in the circumferential direction of the impact protection ring 41 and passing into the annular chamber 29 inside the ring 41. The surfaces 43a of the oblique perforations 43 oriented toward the flowthrough openings 42 form the guide faces in the present instance. The perforations 43, embodied as wall parts deformed inward into the annular chamber 29, with their lowermost point 43b each define the flowthrough openings 42 on one end and effect a deflection of the fuel stream leaving the annular chamber 29 by way of the flowthrough openings 42. They thereby generate the desired force component acting tangentially, which sets the impact protection ring 41 into rotation in the desired manner.

Figure 5:
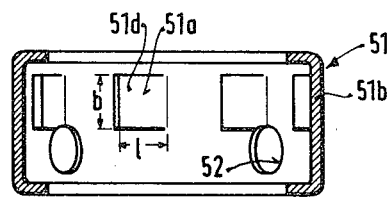
FIG. 5 is a longitudinal section taken through the impact protection cap of the third exemplary embodiment.
Figure 6:
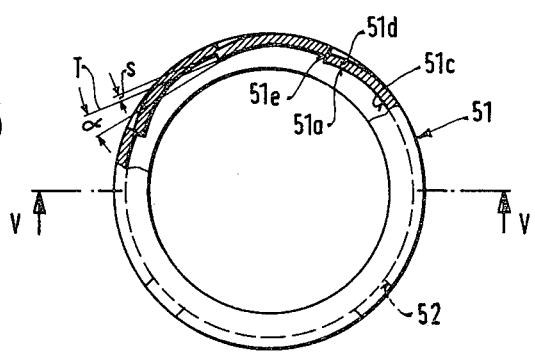
FIG. 6 is a partially cut plan view on the impact protection cap of the third exemplary embodiment.

In the third exemplary embodiment shown in FIGS. 5 and 6, the impact protection ring marked 51 is shown in Fig. 5 in the form of a longitudinal section taken along the line V-V in FIG. 6, and in FIG. 6 as an only partly cut away plan view. The flowthrough openings 52, cut into the cylindrical wall portion 51b in the form of radial bores, are again axially offset with respect to the return flow openings 21 in the pump cylinder 14, just as in the previously described exemplary embodiments. In contrast to the guide faces 31a, 43a of the first two exemplary embodiments disposed in the vicinity of the flowthrough openings 31, 42, each of the guide faces 51a of the third exemplary embodiment is embodied by the surface of a wall portion 51d disposed at the level of the return flow openings 21 and oriented toward them and also inclined with respect to the inner wall face 51c of the impact protection ring 51. Each of the inclined wall portions 51d having the guide faces 51a comprises a rectangularly defined wall zone which is dimensioned slightly larger in terms of both the width b and the length 1 than the diameter of the return flow openings 21 and is pressed through from the outside to the inside on three sides and partly sheared off at the lowermost point 51e. The height s of this lowermost point 51e is slightly less than the wall thickness of the impact protection ring 51. The guide faces 51a are exposed directly to the fuel stream leaving the return flow openings 21 and because of the shape of the guide faces 51a, they impart the desired rotation to the impact protection ring 51. The guide faces 51a form a very flat inclination angle α, amounting to approximately 10°, with respect to a tangent T placed against the wall face 51c.

The foregoing relates to preferred exemplary embodiments of the invention, it being understood that other embodiments and variants thereof are possible within the spirit and scope of the invention, the latter being defined by the appended claims. What is claimed and desired to be secured by Letters Patent of the United States is:

1. A fuel injection pump for internal combustion engines having a cylinder bushing arranged to receive a pump piston, a pump piston in said bushing, said bushing further having at least one return flow opening for returning fuel flow controlled by said pump piston, and an impact protection ring positioned on said bushing, said impact protection ring having a center (M) and pressed by a holder means against an abutment shoulder located above said return flow opening in the pumping direction, said ring further having a cylindrical wall portion and an inner wall provided with means defining openings therethrough which enclose an annular chamber, said wall portion further having flowthrough openings in said inner wall arranged to connect said return flow opening with a return flow chamber, characterized in that said impact protection ring is further provided with guide faces exposed to said returning fuel and causing a rotational movement on the part of said impact ring, said guide faces being molded into said cylindrical wall portion such that they are inclined toward said center (M) of said ring.

2. A fuel injection pump as defined by claim 1, characterized in that said guide faces have a flat inclination angle (α), amounting preferably to 5° to 35°, with respect to a tangent (T) placed against said wall face of said cylindrical wall portion.

3. A fuel injection pump as defined by claim 1 or 2, having said flowthrough openings axially offset with respect to said return flow opening, characterized in that each of said guide faces is embodied by a surface, oriented toward said flowthrough openings and a portion deformed from said wall inward into an annular chamber which surrounds said bushing. (FIGS. 1-4.)

4. A fuel injection pump as defined by claim 3, characterized in that each of said deformed wall portions is sheared off on three sides to form a tongue which is bent inward into said annular chamber and each tongue forms a rectangular flowthrough opening. (FIGS. 1 and 2.)

5. A fuel injection pump as defined by claim 3, characterized in that each of said deformed wall portions comprises an oblique perforation which is pressed inward into said annular chamber, said oblique perforation arranged to merge with said flowthrough opening in the circumferential direction of said impact protection ring, said perforation further having a zone which partially defines said flowthrough opening. (FIGS. 3 and 4.)

6. A fuel injection pump as defined by claim 2, having said flowthrough openings axially offset with respect to said return flow opening, characterized in that each of said guide faces is embodied by the surface of said wall portion disposed at the level of said return flow opening and oriented toward said return flow opening and inclined with respect to said inner wall of said impact protection ring. (FIGS. 5 and 6.)

7. A fuel injection pump as defined by claim 6, characterized in that each of said inclined wall portions comprises a preferably rectangularly defined wall zone dimensioned slightly larger in terms of both the width (b) and the length (1) than the diameter of said return flow opening, said wall zone having an area which is pressed inward from the outside toward the inside on three sides and partially sheared off in said area.

8. A fuel injection pump as defined by claim 1, in which said holder means for said impact protection ring includes a snap ring which is set into an annular groove which further includes a conical abutment face in said bushing, characterized in that said conical abutment face has an inclination angle ($\beta$) and the radial prestressing forces of said snap ring are adapted to one another such that they hold the impact ring against said abutment shoulder without play, whereby a rotational movement of said impact protection ring triggered by recoil energy of a fuel stream leaving the return flow opening is achieved.

* * * * *